United States Patent [19]

Hellstrom et al.

[11] 4,024,964

[45] May 24, 1977

[54] DEVICE FOR STACKING PIECES OF BOARD OR LUMBER

[75] Inventors: Nils-Erik Hellstrom, Nyland; Bengt Artur Berg, Bolstabruk, both of Sweden

[73] Assignee: AB Hammars Mekaniska Verkstad, Nyland, Sweden

[22] Filed: Aug. 25, 1975

[21] Appl. No.: 607,222

[30] Foreign Application Priority Data

Sept. 16, 1974 Sweden .......................... 7411637

[52] U.S. Cl. .......................... 214/6 DK; 198/482; 198/484; 198/796; 214/6 FA
[51] Int. Cl.² .......................... B65G 57/18
[58] Field of Search .......... 214/6 DK, 6 H, 6 M, 214/6 FA; 198/27, 84, 93, 96, 154, 156, 422, 796, 482, 484

[56] References Cited

UNITED STATES PATENTS

| | | |
|---|---|---|
| 2,730,247 | 1/1956 | Lawson .......................... 214/6 H |
| 2,998,133 | 8/1961 | Rambo .......................... 214/6 H X |
| 3,116,835 | 1/1964 | Brandon .......................... 214/6 H X |
| 3,388,784 | 6/1968 | Gartner .......................... 214/6 DK X |
| 3,627,099 | 12/1971 | Shaffer .......................... 214/6 H X |
| 3,696,948 | 10/1972 | Murdoch et al. .......................... 214/6 H X |
| 3,700,120 | 10/1972 | Romick et al. .......................... 214/6 H X |
| 3,913,744 | 10/1975 | Turner et al. .......................... 214/6 H X |

FOREIGN PATENTS OR APPLICATIONS

| | | |
|---|---|---|
| 960,727 | 6/1964 | United Kingdom .......................... 214/6 H |
| 779,777 | 7/1957 | United Kingdom .......................... 198/154 |

*Primary Examiner*—L. J. Paperner
*Attorney, Agent, or Firm*—Silverman & Cass, Ltd.

[57] ABSTRACT

A device for continuously stacking layers of pieces of board or lumber has a lower conveyor transporting the layers of lumber at a first substantially constant speed. An upper conveyor haing L-shaped carrying members overlies the lower conveyor with the open ends of the L-shaped members facing rearwardly. The upper conveyor and L-shaped members move at a second substantially constant speed which is slower than the speed of the lower conveyor. The timing of the two conveyors is arranged such that an L-shaped carrying member drops down slightly below the carrying plane of the lower conveyor in front of one of the layers of lumber. Prior to reahing the end of the lower conveyor the layer of lumber is conveyed above a lower leg of the L-shaped member, due to its faster speed, and the lower conveyor is then lowered so that the layer of lumber is deposited upon the L-shaped carrying member. The L-shaped carrying member with the layer of lumber then continues across the top of a stacking station which is adjusted vertically to receive each layer of lumber and has a movable stopper located on the top of the stacking station to remove each layer of lumber from the L-shaped member as it passes over the stacking station or to allow the layer to pass to a second station.

2 Claims, 2 Drawing Figures

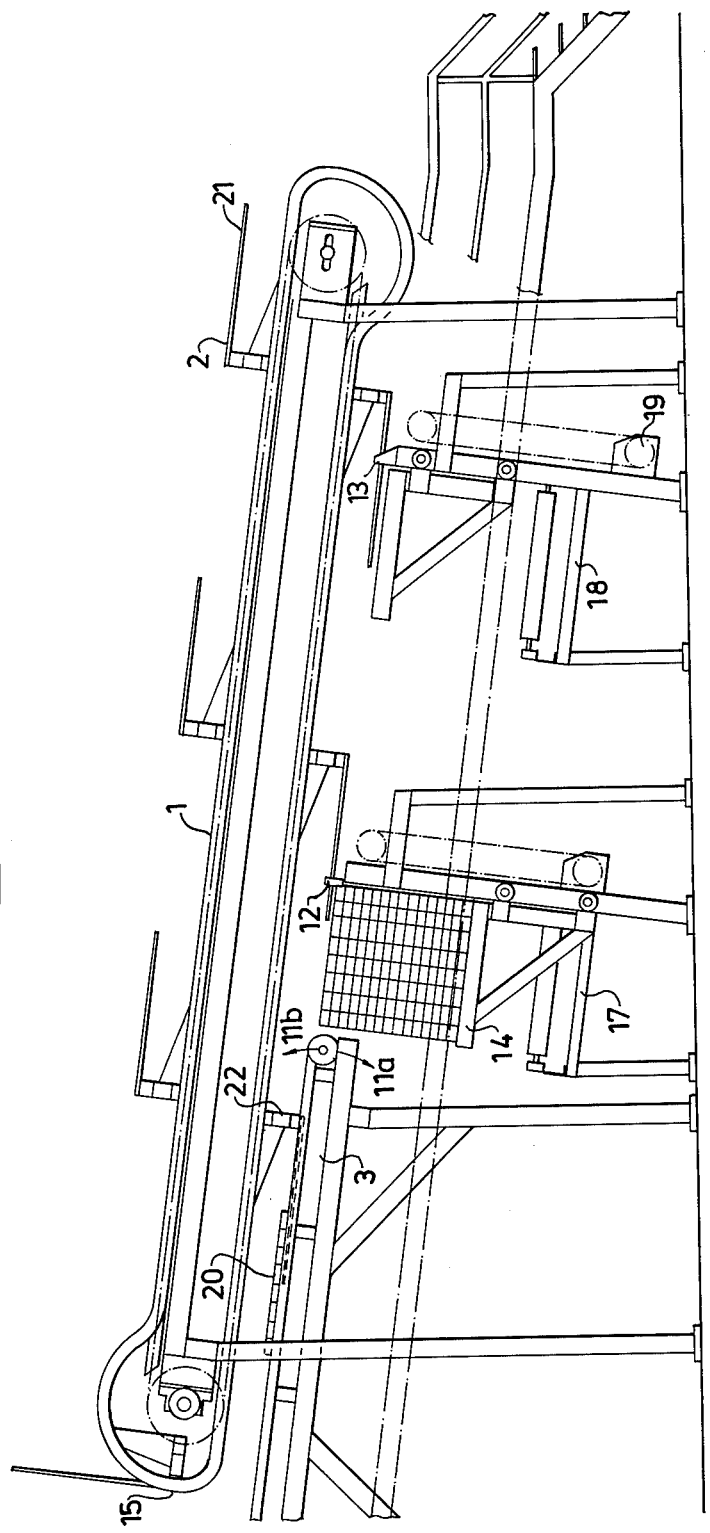

DEVICE FOR STACKING PIECES OF BOARD OR LUMBER

The present invention relates to a device for stacking pieces of board or lumber in a lumber processing plant.

In such plants pieces of lumber, for example boards, are fed from preceding processing stations to a stacking device, in which the pieces of board are placed in layers on top of each other to form a stack.

The Swedish Pat. No. 2539/68 shows a device for automatically placing pieces of lumber, such as boards in layers, moving said layers and making stacks thereof in a lumber processing plate containing a transverse conveyor. Said conveyor is provided with intermittently operating stop means detaining a piece of lumber, said piece of lumber thereby stopping subsequent pieces of lumber, so that a layer of lumber with increasing width is found. When the layer of lumber is wide enough the stop means is removed. The transverse conveyor will thereupon transport the layer to another conveyor, which is working intermittently. By the last-mentioned conveyor the pieces of lumber are transported to a stacking station. By this method the production process is interrupted every time when a stack of lumber in the stacking station has grown to a predetermined size and is to be transported away. The process will be interrupted for the time it takes to transport the stack of lumber away and to prepare the stacking station to receive new layers of lumber.

The problem described above is solved by the present invention by the conveyor transporting and piling layers of lumber to form a stack in the stacking station operating continuously and there being several stacking stations. The present invention is characterized by the fact, that it comprises several stacking stations and a continuously operating upper conveyor provided with supporting planes for transporting layers of pieces of lumber arranged to cooperate, and stacking stations provided with individual stoppers for separating layers of pieces of lumber from said upper conveyor.

The invention will be described below in connection with the attached drawings.

FIG. 2 is a side view of a stacking device according to the invention.

Figure 1:
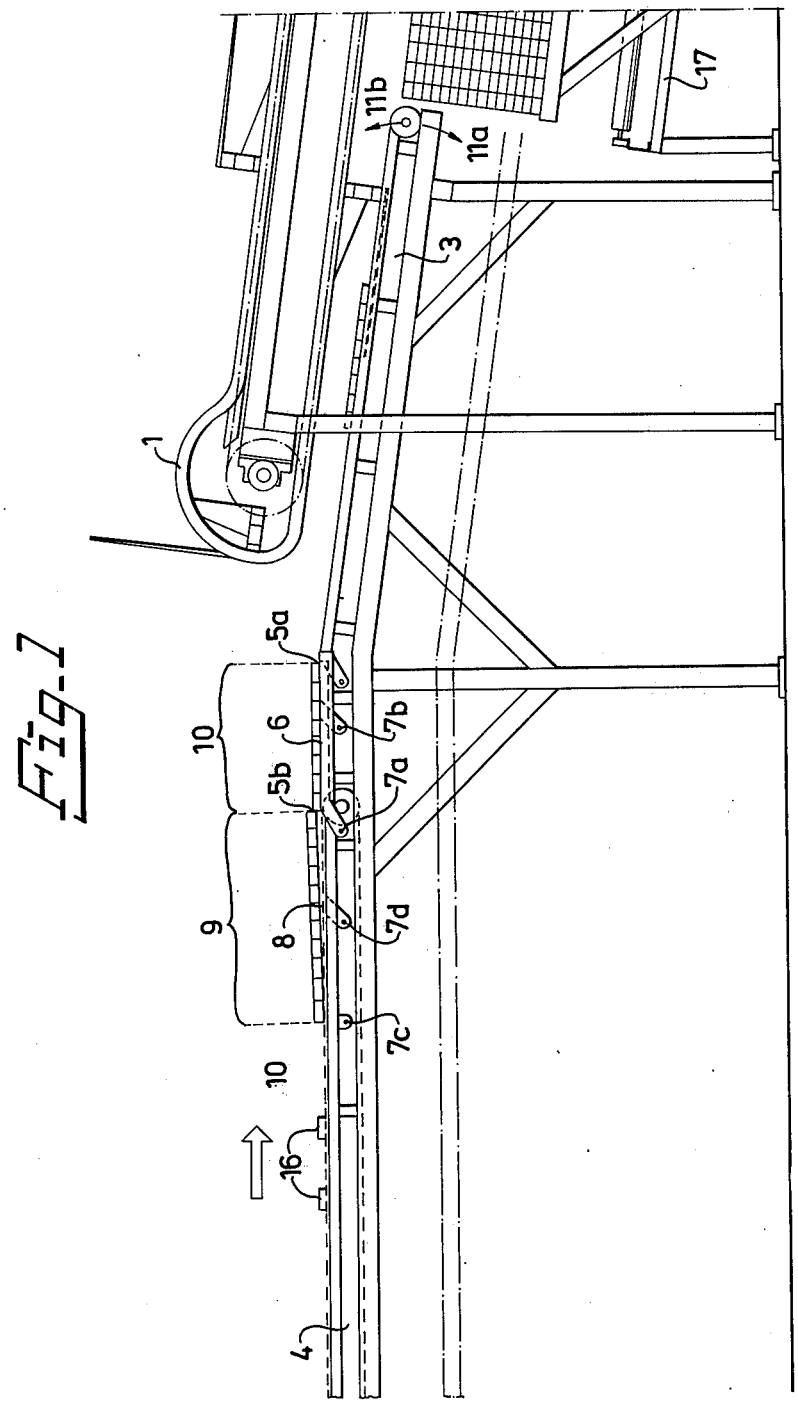
FIG. 1 is a side view of a transverse conveyor and a part of a stacking station situated after the conveyor.

Pieces of lumber 16 are transported from preceding processes to a stacking device by a first conveyor 4.

The pieces of lumber 16 are fed by a first conveyor, the feeding conveyor 4, to a first, not shown, stop means 5a, said stop means being located at the end of a first plane 6, said plane being rotatable around a bearing 7a and provided with a lifting device 7b. Said first plane 6 and a second plane 8 can each have a low position in which the entire plane lies level with the feeding conveyor, and a high position, in which one end of the respective plane is higher than said conveyor. The plane 6 is in its low position when it is ready to receive pieces of lumber. When the plane 6 has received a predetermined number of pieces of lumber it will be lifted. The second plane 8 is lifted by lifting means 7d around a bearing 7c simultaneously as a second stop mens 5b not shown starts to operate. The pieces of lumber are thus fed onto and stopped on the plane 8. Thereafter the first plane 6 will be lowered to the level of the feeding conveyor 4, and the first stop means 5a will be turned away. Said conveyor 4 can now feed a layer 10 of lumber lying on the plane 6 to another conveyor 3. When the layer 10 of lumber has been transferred to said conveyor 3, the stop means 5a will start to operate and the second plane 8 will be lowered. The second stop means 5b will be turned away to let the pieces of lumber 9, which have collected on the second plane 8, to be fed to the first plane 6 by the feeding conveyor 4.

When the first plane 6 has again a predetermined number of pieces of lumber the cycle described above will be repeated.

The feeding conveyor 4 operates continuously, but the feeding of a number of pieces of lumber lying side by side to the conveyor 3 by the stop means and the planes will take place at certain, equal intervals. The conveyor 3 also operates continuously, and it is adjusted in a predetermined timing to the planes 6 and 8, to a continuously moving, upper conveyor 1, and also to a number of stacking devices 17, 18, by automatic electronic control means. Said upper conveyor 1 is located above and partly projecting over the conveyor 3. Said upper conveyor 1 is further provided with a number of L-shaped members 2, which are driven around the conveyor 1. The stacking devices 17, 18 comprise a stack supporting member 14 which is movable upwards and downwards, said member 14 comprising several rolls (not shown), means 19 to move said member 14 upwards and downwards, and means to adjust said member 14 into a suitable level.

Before a layer 20 of lumber is fed to the conveyor 3 by the feeding conveyor 4, one of the L-shaped members 2 has passed the curved portion 15 of the upper conveyor 1. The member 2 will be moving on the lower portion of the upper conveyor to the right in FIG. 2, the supporting plane 21 of the member 2 being parallel to and somewhat under the upper portion of the conveyor 3.

The conveyor 3 moves continuously like the upper conveyor 1 but the conveyor 3 has a higher speed than the upper conveyor 1. This has the consequence that the layer of lumber 20 on the infeed conveyor 3 has such a speed relative to said member 2, that the layer of lumber 20 will reach the thick portion 22 of the member 2. This happens before said thick portion passes the right end of the conveyor 3.

When the layer of lumber has reached the L-shaped member 2, the right end of the conveyor 3 will be lowered, as shown by the arrow 11a in FIG. 2, by a device not shown, whereby the layer of lumber will come to rest on the supporting plane 21 of the member 2. When the member 2 with lumber thereon has passed the right end of the conveyor 3, this will be lifted again to its initial position, as shown by the arrow 11b, and the next layer of lumber that has collected on the first plane 6 will be transferred to the conveyor 3. Thereafter the next layer of lumber will be received in the manner described above by the next L-shaped member 2 of the upper conveyor 1 and the cycle will thus be repeated.

The L-shaped members 2, having pieces of lumber on their supporting planes 21, move continuously on to a stacking devide 17. When the stacking device 17 is empty and prepared to receive a first layer of lumber, the stack supporting member 14 is in an upper position as in the stacking device 18 in FIG. 2.

When an L-shaped member 2 with pieces of lumber on its supporting plane moves towards the stacking device 17 a stopper 12 will be swung up, whereby the pieces of lumber on the supporting plane 21 will be stopped and come to rest on the stack supporting member 14, when the supporting plane 21 passes the stacking device 17. The stoppers 12, 13 can have two positions, one swung up vertical position and one swung down, hosizontal position. In the vertical position the layers of lumber are removed from the supporting plane, and in the horizontal position the layers are not removed. Thereafter the stack supporting member 14 will be lowered by the lift 19 a distance, that corresponds to the height of a layer of lumber, to be prepared to receive the next layer of lumber. This cycle is repeated until the stack supporting member 14 has been lowered to its lowest position and so many layers of lumber have been piled that a bundle of the desired dimensions has been obtained. When this is down, the stopper 12 will be swung down.

The ready bundle of lumber is transported away from the stacking device for further treatment.

When the stacking device 17 does not need any further layer of lumber, the first layer received by the L-shaped member 2 will pass the stacking device 17 by the stopper 12 being swung down. Instead the layer will be placed on the stack supporting member of the stacking device 18 by a second stopper 13.

By separating the cycle the stacking device 18 will be filled to the desired level. Thereafter possible further stacking devices not shown will be filled until the stacking device 17 is ready to receive new layers of lumber.

By an upper conveyor 1, which is moving continuously and provided with several L-shaped members 2, and a feeding conveyor 3 also continuously moving but at a higher speed than said conveyor 1, and by providing the plant with several stacking devices 17, 18, as described above, it is possible to feed pieces of lumber 16 continuously one by one into the plant without interruptions for removing ready bundles of lumber.

Up to now it has not been possible to arrange several stacking devices after each other in the transport direction of a conveyor, where the conveyor is substantially horizontal, but by the present invention this is now made possible.

It is a great advantage of the device according to the present invention, that the stacking speed is essentially increased by the use of several stacking devices at the same time. Hereby the feeding of pieces of lumber into the plant is not interrupted, when a stack of lumber is removed from the stacking plant for further treatment. Consequently the conveyor can operate continuously.

It is a further advantage of the device that the width of the layers of lumber and thereby the width of the stacks, can be varied very easily by letting the second stop 5b start to operate when a desired number of pieces of lumber lie against the first stop 5a.

A further very great problem in stacking of lumber is also solved by the present invention. When changing the type of lumber, for example the length, it is very difficult to adjust the number of pieces of lumber fed in of the preceding length before the change to form a complete stack. Up to now the last pieces must be removed manually, as only complete stacks can be accepted for further treatment. By the device according to the present invention these last pieces can be collected in a separate stacking station not shown situated after the two illustrated stacking stations 17, 18. The last stacking station will thus receive pieces of lumber of various lengths and there a stack of such pieces, here called residues, is formed. By the present device the manual treatment of residues will be unnecessary at the same time as these are collected in stacks that are easy to handle. This also implies that there will be no interruptions in a stacking plant because of residues being removed manually. The stacking will be continuous also when the type of lumber is changed.

The device as described above in principle can also be used for other elongate objects, for example elongate objects of some other material than wood.

The invention is not limited only to the embodiment described and shown in the drawings, as it can be varied, especially as regards the shape of the details.

What we claim is:

1. A device for stacking pieces of board or lumber comprising:
    a lower conveyor, having a transport plane for transversely conveying layers of said pieces of board or lumber in a transport direction at a first substantially constant velocity;
    an upper conveyor having its transport direction arranged substantially parallel to said lower conveyor, overlapping one end of said lower conveyor, having a plurality of L-shaped carrying members with an open end of said members opening opposite said transport direction, said members being formed by a first leg attached to said upper conveyor and a second leg of sufficient length to carry one of said layers of pieces of board or lumber, said upper conveyor having a second substantially constant velocity less than said first velocity;
    said upper conveyor timed in relation to said layers of pieces such that one of said L-shaped members passes in front of one of said layers of pieces and slightly below said lower conveyor transport plane, such that said layer of pieces will become positioned above said second leg in a receiving position;
    means for lowering said lower conveyor when said layer of pieces is above said second leg, prior to passing beyond the end of said lower conveyor, such that said layer of pieces will be laid upon said second leg;
    means for raising said lower conveyor back to said transport plane prior to the arrival of the next one of said layer of pieces; and
    at least one stacking station located beneath said upper conveyor in said transport direction;
    said stacking station including a stack supporting member vertically adjustable downward from an upper position immediately below the second leg of an L-shaped member passing thereover, said stack supporting member generally paralleling the second leg and receiving a layer of pieces therefrom without disruption of the layer, said stack support member being adjustable downward in increments each approximately equal to the height of a layer.

2. A device according to claim 1 wherein at least two of said stacking stations are aligned beneath said upper conveyor in said transport direction, each said station at its upper portion provided with a movable stopper for removing one of said layers of pieces from said L-shaped member when said stopper is in a first upper position, and movable to a second lower position to allow said layers of pieces to pass to the next stacking station.

* * * * *